United States Patent [19]
Bartram et al.

[11] Patent Number: 5,162,862
[45] Date of Patent: Nov. 10, 1992

[54] LIGHTSPEED-RELATED MEASUREMENT APPARATUS

[75] Inventors: Christopher P. Bartram, Holsworthy, England; John S. Strachan, Edinburgh, Scotland

[73] Assignee: Optical Metrology Limited, Southampton, England

[21] Appl. No.: 637,643

[22] Filed: Jan. 4, 1991

[30] Foreign Application Priority Data

Feb. 13, 1990 [GB] United Kingdom ............... 9003221
Nov. 20, 1990 [GB] United Kingdom ............... 9025167

[51] Int. Cl.[5] ............................................. G01S 13/08
[52] U.S. Cl. ..................................... 356/5; 342/127
[58] Field of Search ........................... 356/5; 342/127

[56] References Cited

U.S. PATENT DOCUMENTS

| 4,044,353 | 8/1977 | Levy | 342/127 |
| 4,146,328 | 3/1979 | Hullein et al. | 356/5 |
| 4,238,795 | 12/1980 | Schiek et al. | 342/127 |

Primary Examiner—Mark Hellner

[57] ABSTRACT

Time of transit of a propagated electric signal at lightspeed is used as a measure of distance from a transmitter (laser 32) to a receiver (photodetector 39) via a target (reflector 14). A continuous modulating signal of fixed frequency (10.700 MHz) is transmitted. The distance traversed is measured by a timer which compares the phase at transmission with that at reception. The invention involves a heterodyne down-conversion technique involving two crystal oscillators (30, 31), which are phase-locked to assure that one regulates the other to keep their frequencies in linear proportional relationship, both being at the transmitter location, which transfer the phase difference to a 10.45 kHz frequency, thereby facilitating high resolution and precision measurement by extending the time measure representing distance.

5 Claims, 2 Drawing Sheets

LIGHTSPEED-RELATED MEASUREMENT APPARATUS

FIELD OF INVENTION

This invention relates to measurements which depend upon the speed of light, by which is meant the speed of propagation of electromagnetic waves and electric signals, whether travelling through vacuum, liquid or gas or carried by waveguides or other electrical circuit means Distance can be measured in terms of a known lightspeed by transmitting a modulated electric signal which is reflected or retransmitted from a surface at a distance to be measured to produce a received signal which is then analyzed to provide the measurement data. Alternatively, such analysis providing a measure of lightspeed over a known distance can constitute a measure of the refractive index or dispersive properties of the propagating medium. Specifically, the invention relates to the measurement of a phase-shift in a propagated signal, which measurement is translated into control or indicated information in the apparatus utilizing the invention.

In one form the invention constitutes what can be termed an 'optical radar system', which is able to measure distance by timing the period between signal transmission produced by modulating a laser and the reception of the reflected signal. However, the novel principles involved have application to any form of electromagnetic wave carrier, including optical fibres, and even to electrical signals propagated by wires, where the object is to measure distance by detecting phase differences between transmitted and reflected or regenerated versions of the primary signal.

A typical application of an optical distance measuring system using the invention is the measurement of the level of liquid or powder in a tank, which incorporates a sensor at the top of the tank responsive to its own laser emission as reflected from the surface at the test level.

BACKGROUND OF THE INVENTION

Hitherto, the use of radar principles for such a purpose has been deemed impractical, owing to the difficulty of measuring range distance with high enough precision. It is known to transmit short radio pulses and to sense the echo reflection of those pulses in the short period between pulse transmission as a means of measuring distance. A problem is noise from spurious reflections and the assumption is that the carrier medium transmits the signal either way with a definite and known propagation velocity. Usually this is the speed of light in air, for which a one-way distance of 0.3 meters corresponds to a transit time of 1 nanosecond in vacuo and a somewhat longer duration in solids and liquid substances.

The precision of such a measurement is a function of the precision with which this short time period can itself be measured. Although the pulse repetition rate can be high and an average of numerous such measurements obtained, the resolution or sensitivity of the measurement is limited to the response time of that basic time measure.

It is known that a continuous electrical signal of high frequency can be propagated in a modulated form and the distance assessed from the phase shift as between the modulation of the transmitted signal and the received signal. If used over a fixed and known distance, such techniques can measure the speed of light. The accuracy of the measurement is then a function of the degree of precision governing the phase shift measurement.

By way of example a modulating frequency of 100 MHz corresponds on a round-trip basis to a range of 1.5 meters per wavelength of phase shift. Thus, if the transmitted signal is propagated continuously and the phase shift is measured continuously, knowledge of the precise phase shift can give a range measure somewhere in a scale unit of 1.5 meters, but the problem then is that it is not known how many scale units exist between the transmitter and the target reflector.

To measure absolute distance, as opposed to integrating a measure of time rate of change of distance and so deduce a change of distance, the wavelength of the modulating signal has to be greater than the range of uncertainty of the position of the target. The smaller this wavelength, the more useful the system is for measuring short distances with high precision, as for control measurements confined to the ranges between relatively moving parts of apparatus in an industrial application. However, then the time or phase measurement is more demanding.

Primarily, this invention addresses the latter problem in aiming to provide a cheap and reliable technique of radar type scanning at very short ranges measured in meters and centimeters to accuracies that are quite small fractions of a millimeter.

Typical applications are for data acquisition, for example, by the remote sensing of the precise liquid level in a storage tank subject to hazardous conditions or by the remote sensing of the position of a scanning probe as it is manipulated over the surface of a body or structure being surveyed. Indeed, the invention has particular application for short-range distance measurement as well as precise long-range survey work. Hitherto, radar-type scanning methods have lacked the precision needed for such applications.

To achieve at moderate expense the very high precision and reliability demanded using speed-of-light ranging methods, the inventors have addressed a problem confronting those who have sought to ease the phase-shift measurement by frequency down conversion. The problem is one of avoiding the very low frequency oscillations which are easily set up where two oscillators cooperate at nearly equal frequencies. This affects the stability of any distance indication.

Long distance ranging methods, such as communication with a space craft, have been suggested in which the signal transmitted is received at a remote receiver in a space craft having its own oscillator and retransmitted back to source at a different frequency.

Short distance ranging methods, such as liquid level sensing in a container, have been suggested in which the transmitted signal is reflected and sensed by a receiver closely adjacent the transmitter. In one such method two oscillators operating at slightly different frequencies were proposed, one serving to modulate the transmitted signal and the other operating in conjunction with the detecting receiver to demodulate the received signal.

Important, however, from the viewpoint of reliability and precision, is the need for the relative phase information carried by the transmitted and received signals to be preserved by processing both signals at the point of comparison at the same frequency in an identical way. This is best achieved if all the electronic data processing occurs in the same circuit unit. Furthermore, as will be seen from what is proposed in the subject invention, it is preferred that the generation of two slightly differing frequencies, one for the transmitter-receiver circuit and one for the frequency down-conversion analysis should be phase-locked to avoid the spurious low frequency effects which otherwise make the distance measure unreliable.

The inventors are aware of a technique for measuring the relative speed of light as between parallel transmission along two different propagation channels, by sensitive phase difference measurement and use of a common signal source having a frequency monitored under the control of a phase-locked loop responsive to the reduced frequency of a frequency-shifted version of the primary signal. The object of this prior art technique, as described by D. R. Gagnon, D. G. Torr, P. T. Kolen and T. Chang in an article entitled 'Guided-wave measurement of the one-way speed of light' in Physical Review A, 38, 1767 (1988), is essentially to keep the test frequency constant in spite of movement and reorientation of the apparatus. The invention to be described involves entirely different principles, in that the phase-locking feature of the implementations involving the subject invention has the object of enhancing the precision of the phase measurement representing distance rather than merely controlling the stability of the frequency of the primary signal. Even though the latter is essential to both this invention and the prior art disclosure and though crystal oscillators are used as stable control sources, the phase measurement technique, which is vital to the measurement of the lightspeed and is the subject of this invention, is quite different from that disclosed in the prior art.

Reference may also be made to Wikland and Ericson U.S. Pat. No. 4,229,102 which applies the principle by which two oscillators operating at slightly different frequencies are used, one as the primary oscillator determining the frequency of the transmitted and the reflected signal, and the other as a secondary oscillator, the signal of which is separately mixed with the transmitted and received signals to develop a measure of phase on an extended time scale at the frequency difference of the two oscillators. This disclosure refers to phase-locking but in the context that two signals are compared which may each be subject to drift affecting phase. The object is to make a separate calibrating measure and so compensate for the phase error involved when the signals are used to perform a distance measure over a calibration range of an internal optical path. Thus, the phase-locking in this prior art disclosure is effected through a double measuring operation and involves circuit components positioned away from the oscillators to sense a phase error which takes into account other circuit phase shifts, whereas the invention to be presented below concerns an absolute phase-lock of one oscillator by the action of digitally synthesizing from each of the oscillators a signal at the difference frequency and regulating one oscillator to keep these synthesized signals in precise time accord.

The disclosure in Hullein and Fribault U.S. Pat. No. 4,639,129 also uses two oscillators and mixer techniques to transfer the phase measure to a lower frequency, but is concerned with techniques for sampling the phase measurement as an indication of the test distance and averaging the measurement as a function of its variation.

The assumption in such disclosures is that two oscillators are stabilized suffiently to operate with no significant drift during the time lapse corresponding to the lower frequency phase measurement of the mixer output. Any such drift can be taken into account by comparing measurements of such low frequency phase as between the two non-transmitted signals and the comparison of the received and non-transmitted signals. However, in such prior art proposals the emphasis is placed on the interpretation of phase measurement by signal calibration and correction at the output stage, whereas in the invention to be described a very positive phase-lock as between the two oscillators is deemed to be of paramount importance and other spurious phase shifts are compensated by the identical matching of the circuit components in the two signal channels.

In this way, the invention to be described not only achieves a resolution and measurement precision that is superior but does this by an inexpensive combination of circuit components, which extends the range of practical application of such optical radar measurement methods.

BRIEF DESCRIPTION OF THE INVENTION

According to the invention, lightspeed-related measurement apparatus, comprises means for producing a continuous signal at a fixed frequency and transmitting this signal over a test distance from a transmitting source to a receiver having direct circuit connection with said source, whereby the phase of the signal is shifted during transit in relation to the phase of the signal at the source and in proportion to the distance travelled, and timing means controlled in dependence upon the phase of the transmitted signal and connected in an electronic circuit incorporating detector means which responds to the received signal and measures the relative phase shift over the test distance, the apparatus being characterized in that the electronic circuit includes signal amplitude control means for adjusting the amplitude of at least one of the signals to bring their strengths into matching relationship and, in close proximity in the electronic circuit, separate frequency conversion means, each connected to signal generating means producing a reference signal controlled to have a frequency that is linearly proportional to said fixed frequency and each being connected to respond to a corresponding one of the transmitted and received signals, to modify the frequencies of both signals by an identical reducing amount equal to the frequency of the reference signal before these are supplied to the timing means, whereby to provide the phase input to the timing means at a longer wavelength and so extend the time measure representing the distance as a function of the speed of light.

By 'direct circuit connection' is meant a physical connection such as an electrically wired circuit or circuit board connections or a screened coaxial cable or even an optical fibre. This distinguishes the connection from the open part of a loop along which signals propagate over a range of unknown length subject to extraneous noise and the distance measure of which is being tested.

According to a feature of the invention, the apparatus includes oscillator means at the transmitter location for producing two separate signals having frequencies which differ by a regulated but constant frequency which is small in relation to the frequency of either signal, one of the separate signals being synthesized from a first oscillator to ensure phase coherence with a signal produced by an independent oscillator, circuit means by which one signal regulates the frequency of the transmitted signal and other circuit means by which the other signal provides a control frequency in the apparatus, said frequency conversion means comprising signal mixer means by which a reference signal is produced by mixing the control frequency signal and the received signal, whereby to retain as input to the timing means the phase difference between the transmitted and received signals at the long wavelength corresponding to the small frequency difference between the oscillator signals.

According to another feature of the invention, the signal mixer means comprise means for generating two beat frequency signals at the small difference frequency to form the resulting reference and test signals which are then shaped to square waveform by limiter circuit means, and the timing means are sensitive to a start time set by the edge timing of one such square waveform, whereas the edge timing of the other such square waveform controls the count stop time measure of the timing means and so provides an output indication related to the distance measurement.

According to a preferred feature of the invention, the timing means is set to have a start time controlled by the edge timing of the square waveform produced by the test signal and a count stop time controlled by the immediately following corresponding edge timing of the square waveform produced by the reference signal.

According to another feature of the invention, the timing means comprises electronic storage means operative to store data representing a predetermined number of sequential time-overlapping intervals which each indicate the distance measurement and means for computing a mean value of the measured distance by recurrent averaging of the data in store, which mean value constitutes the output information supplied by the apparatus.

According to a further feature of the invention, in the apparatus a primary signal is produced by a first crystal oscillator and a secondary signal is also produced by a similar second crystal oscillator controlled to operate at a slightly different frequency, the first oscillator serving as the master control for the second oscillator, the latter having means for controlling its stable frequency operation over a limited range, which means are connected to respond to change in the control voltage output from an electronic circuit means connected to compare the outputs from two frequency divider chain circuits by which the respective oscillation frequencies of the two crystal oscillators are divided by integers differing by a relatively small amount, whereby the two oscillators become phase-locked, with their frequencies being respectively proportional to said integers and providing respectively the signal frequency governing the transmitted signal and the frequency of the signal at the control frequency.

According to another feature of the invention, the apparatus incorporates two parallel circuit paths each comprising narrow band filters, such as ceramic filters, and mixer circuits, with the transmitted signal and the received signal being fed as input to separate parallel circuit paths, whereby the filters each obstruct throughput of all but a pure sinusoidal signal which is fed onwards as input to a corresponding mixer circuit, where it is subjected to heterodyne downconversion of frequency by mixing with a signal of a lower control frequency, supplied to both mixer circuits, the resulting output signals from these two parallel paths providing the inputs for phase difference measurement in the timing means.

Other features of the invention, which include the application of the invention to the modulation of carrier waves, such as a laser beam, and the multiple range measurement at different modulating frequencies for scaling the test range, will be evident from the following description with reference to the accompanying drawings. One such feature concerns a calibration test means in the form of a rotatable polarizing mirror located at a fixed and known distance from the transmitter in a reflected ray path over which distance is to be measured.

DETAILED DESCRIPTION OF THE INVENTION

The invention to be described involves measurement of time of travel of a signal at the speed of light c over a distance D. The measurement information has a high radio frequency (say 10 MHz or 100 MHz) and may be a modulating signal carried by an optical beam, such as a laser beam. If this modulating frequency is denoted f, then the transit time over distance D can be expressed as a phase shift, which is $Df/c$ when measured in wavelengths.

Assuming that the distance being measured is of the order of one wavelength, the task addressed is that of measuring a phase shift with high precision, even though the full wavelength corresponds to a tenth or a hundredth of a microsecond.

To measure phase shift through an angle s radians, one needs to compare the phase-shifted oscillatory signal, denoted $A\sin(wt-s)$ with a reference signal $A\sin wt$, where w is the angular frequency in rad/s. The apparatus provided by this invention measures s by mixing the phase-shifted oscillatory signal with another oscillatory signal $A\sin(w't)$ of angular frequency w' differing slightly from that of the test signal to produce a beat signal which has a frequency equal to half the sum of w and w' and which is modulated at a frequency which is half the difference of w and w'. The latter beat signal component can then be formed into a signal from which the high frequency component has been filtered. In this way, allowing for non-linearity by amplification or rectification action in the filtering process, a signal can be produced which is at double the frequency of the above beat signal, that is at a frequency $w-w'$.

The sensing of the phase-shift s is then possible by measurement over a protracted period because s is preserved as the phase-shift of the output signal at the difference frequency. This is easily understood if the mixing is taken to be a superposition or addition of the two signals $A\sin(wt-s)$ and $A\sin(w't)$. Mathematically, this becomes $2A\sin[(w+w')t/2 - s/2] \cos[(w-w')t/2 + s/2]$. By filtering action which follows the magnitude of the low frequency beat component, which varies at twice the frequency of $(w-w')/2$, the phase-shift parameter s is retained as a phase of the resulting output signal at this low frequency. In other words, the objective of measuring s to high precision as a phase of a high frequency signal has become a task of measuring the same s value over a protracted period as a phase-shift applicable at the low frequency difference.

It is essential, however, for this technique to be used in this way, that the angular frequencies w and w' are held sufficiently stable and, moreover, that the signals compared are truly sinusoidal in waveform. Any electronic circuit design which fails to secure these conditions is unlikely to perform in a commercially satisfactory way.

The preferred design implementation which is the subject of this invention secures the frequency stability objective by using a crystal oscillator to determine one frequency and by assuring that the basic non-shifted signals, the transmitted signal at frequency w and the reference signal at angular frequency w', have a phase-locked association, meaning that there is no significant spurious phase drift affecting the stability of w−w'.

The sinusoidal waveform conditions are secured by the use of identical ceramic filters which process the compared signals at the common transmission frequency and which are both part of a compact electronic circuit. By using two identical circuit channels in close proximity to process the matched signals conveying the phase difference s at the transmitted modulation frequency, and using identical filter networks, the signal information determining s entering the frequency down-conversion stage is secured.

In the specific application to be described by reference to FIG. 3, the phase-shift s is the phase difference between two 10.7 MHz signals, the transmitted signal and the signal received after reflection from a target. Thus the mixing circuitry is duplicated by separately transferring the phase data to two low frequency signals which are then compared to afford the output measure of s.

It follows that the measure of D in terms of a phase-shift can be referenced on the difference frequency and so be far easier to measure with precision, provided appropriate electronic circuitry assures the frequency stability and phase-locking just suggested. This, in essence, is the basis of this invention, in that the specific combination of features which bring about the above result is novel and has been shown to perform with remarkable reliability in measuring very small displacements even though the test is at the speed of light.

Figure 1:
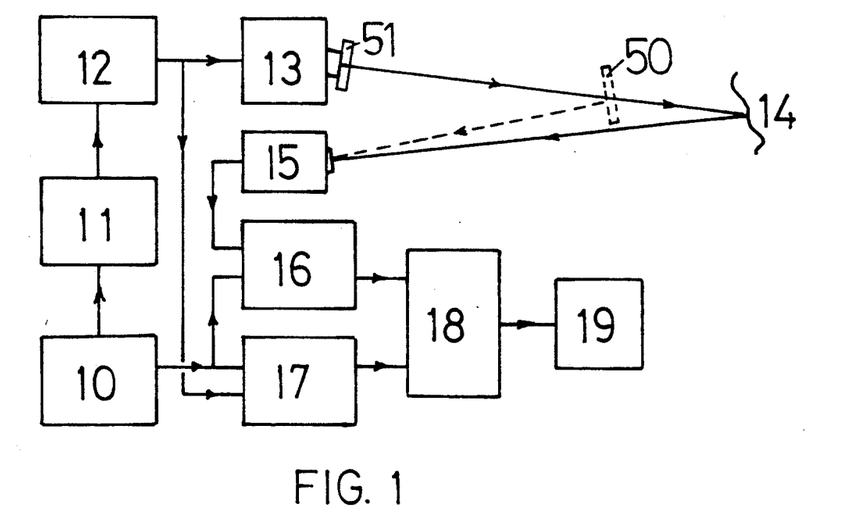
FIG. 1 shows a block schematic circuit of a laser distance measuring system incorporating the invention.

Referring to FIG. 1 a crystal oscillator circuit 10 generates a primary signal at a frequency of 10.700 MHz. A synthesizer circuit 11 controls the frequency of oscillation of another crystal in oscillator circuit 12 designed to be operated in phase locked relationship with the primary signal so that a secondary signal at a frequency of 10.68955 MHz is produced, that is 10.45 kHz below the frequency of the primary signal.

The design of the synthesizer circuit 11 is such that the lock of the phase of the 10.68955 MHz signal to the 10.700 MHz signal of its associated oscillator in circuit 12 will allow the 10.45 kHz difference frequency to maintain the same phase relationship as the signal produced by the primary oscillator in circuit 10.

The secondary signal is used as a transmission signal by modulating the optical output of a laser source 13 which emits a ray at light speed which is intercepted by target area 14. This ray is reflected and detected by a photodetector 15 which provides a received signal. The latter is fed into an input channel circuit 16 where it is filtered and mixed with control signal derived from oscillator circuit 10 and having the frequency 10.700 MHz. This produces a test signal output at 10.45 kHz. Similarly, the primary signal is used as the control signal and supplied as input to a reference channel circuit 17 where it is also filtered and mixed with the transmission signal derived from oscillator circuit 12. This also produces a reference signal output at 10.45 kHz.

In order to assure as far as possble a compensation for any fluctuations of circuit parameters owing to temperature drifts and other factors, the designs of the circuits processing the received signal and the transmitted signal are identical.

Thus both are processed through identical ceramic filters in the circuits 16 and 17. Also both signals are subjected to the same form of mixing operation. This includes the generation of square waveform versions of the compared signals, their amplitude matching and then their mixing by summing and rectification to develop an output signal that is a measure of the phase difference.

The counter circuit 18 functions to measure the phase difference between the 10.45 kHz test signal and the 10.45 kHz reference signal. The test signal contains the distance measure when phase-related to the reference signal. The output from circuit 18 is fed to a digital display 19 and this is the indication of the distance measured.

As described, it is the primary signal produced by the master oscillator that serves as the reference, whereas a slave oscillator which is phase-locked to the master oscillator produces the secondary signal for transmission. Equally, it could be the signal at the frequency of the master oscillator that is used for the transmission and the slave oscillator could generate the phase-locked reference frequency signal. As will later by seen, this applies to the circuit described in more detail by reference to FIG. 3.

Figure 2:
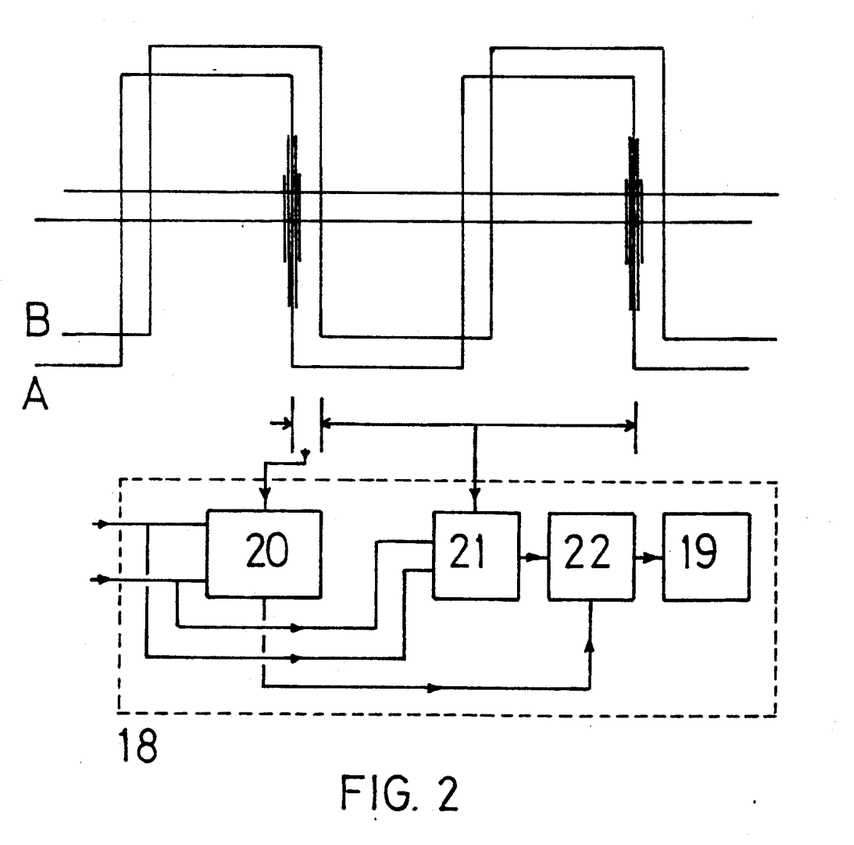
FIG. 2 shows waveforms of transmitted and received modulating signals after frequency shifting and squaring as they pertain to a timing circuit.

FIG. 2 depicts waveforms A and B of the transmitted and received signals, respectively, and, in its lower part, depicts a block schematic circuit which involves counters measuring clock pulses controlled by waveforms A and B.

The circuit operates at a basic clock rate regulated by a master oscillator. For example, a 10.700 MHz oscillator could be used to count at the 10.700 MHz frequency as it registers time lapse between the trailing edges of a transmitted and received signal having a basic 10.45 kHz clock frequency. The frequency ratio involved is a binary-related decimal quantity 1024, to facilitate the design logic of the circuit.

Thus suppose counter 20 registers a count of 250 in each cycle and that counter 21 registers a count of 1 for each cycle. By allowing the counts of both counters to accumulate over the same time period before the data is sampled periodically, a computation of the count ratio in relation to 1024 will be a measure of the distance being measured. The distance will, of course, be scaled in relation to the time measure by the speed of light.

Any random drifts attributable to signal noise and normal fluctuations will be averaged by such data sampling and this will not preclude measurement with high precision. systematic errors arising from temperature drift effects on the electronic circuitry can be reduced by matched design of the two circuits producing the compared signals.

However, one source of non-random error could arise from frequency drift of the master oscillator and the lines drawn on the trailing edge of the waveform A in FIG. 2 are intended to show a fluctuation of one waveform in relation to the other due to frequency changes whilst the signal is in transit over the measured distance. With such fluctuations in mind, a preferred structure provided by the invention requires that the roles of counter 20 and 21, as just described, are reversed. Thus counter 21 in FIG. 2 registers the time lapse between the trailing edges of the transmitted signal. In the example just quoted this means that the computation performed in the processor 22 is based on offsetting a basic count of 1024 for each cycle in the sample period.

This has the advantage that, if the master oscillator frequency is changing, the wavelength of the transmitted signal will change relative to that of the received signal and this will result in less relative error in the count if counter 21 measures the longer period. The period between the trailing edge of the received signal and the leading edge of the transmitted signal will, in a practical circuit, be longer than the period timed from the transmission to reception.

As seen from the waveform depicted in FIG. 2, it is assumed that the amplitudes of the square form of these waves are the same. They are shown in a staggered amplitude presentation merely to distinguish them but the time measure which advances from left to right is not staggered. The periods denoted by the arrows on the input to counters 20 and 21 signify the relevant count periods.

In order to assure that the received signal B has the same amplitude as signal A, the stronger signal will need to be attenuated or the weaker signal amplified to secure this condition. However, in practice, the received signal can be amplified as part of the detector function and, after the frequency conversion or mixer stage, to form the square waveforms a threshold of limiting level of signal strength is determined by electronic circuitry which thereby attenuates the two signals involved and so assures their near equality in amplitude before they are used as inputs to the counters 21 and 22.

The invention can be used with a laser system as described by reference to FIG. 1, this being a system in which an optical frequency is the carrier frequency modulated by the sythesized or oscillator-generated electrical signals. However, the carrier frequency can be a high frequency radio signal in a radar-style implemenation of the invention. In either case there is a continuous signal of fixed frequency which is a modulating signal regulating a carrier wave of steady frequency which conveys the transmitted signal over the distance to be measured and the received signal is the modulated signal of the received carrier wave.

The advantage of the laser implementation is that for applications that involve short range distance measurement the laser beam can be directed onto a reflecting target and the reflected signal sensed by a detector receiver adjacent to the laser source.

By incorporating in the circuit a dual system for generating two modulating frequencies for coarse and fine distance measurement, the test range can be much larger than the wavelength of the signal of higher frequency. Thus the distance measured can be specified as a specific fraction of the longer wavelength, a coarse or approximate measure and, within that tolerance, a specific fraction of a very much shorter wavelength to give a very precise overall measurement.

The design technique by which the superposition of the modulating signals in the transmitted form of signal can be secured will be obvious to those skilled in the electronic art, as will be the techniques by which the respective signals at different frequencies can be filtered from the received signals. Then the circuit design is merely a duplication of that already described with provision for different frequency of operation and the distance measure in a digital display having its most significant digits set by one circuit and its least significant digits set by the other circuit.

Figure 3:
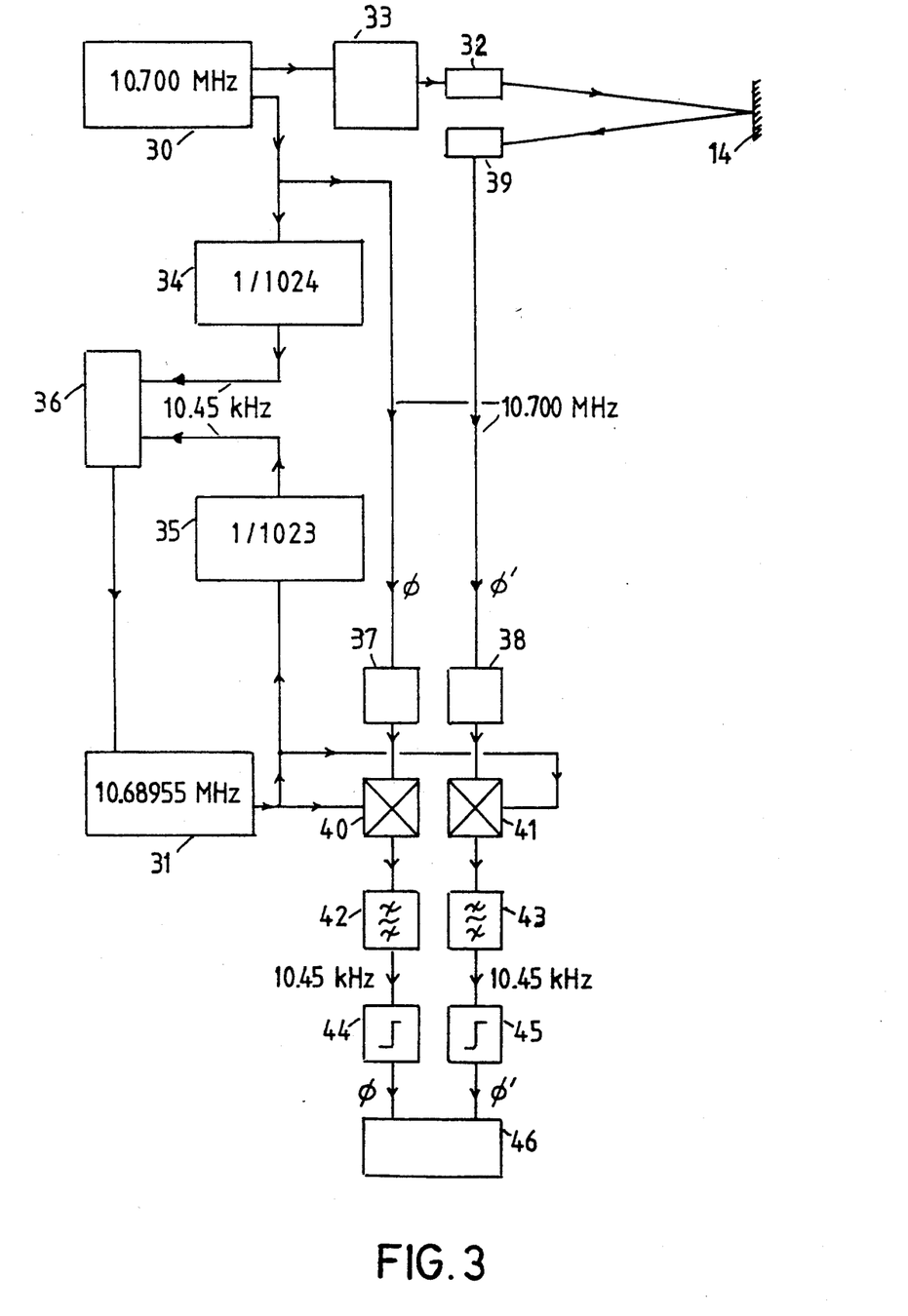
FIG. 3 shows a more detailed block schematic circuit version of the combination of circuit components of a different version of the system of FIG. 1 as used in one practical circuit implementation of the invention.

FIG. 3 shows a more detailed, but nevertheless schematic, outline of the circuit units which feature in one practical implementation of the invention.

Referring to FIG. 3 there are two crystal oscillator circuits 30, 31 both of which operate nominally at 10.7 MHz. The crystal oscillator in circuit 30 is the primary oscillator producing the reference frequency which, in this case, is used to amplitude-modulate the optical output from a laser 32. Circuit 33 is located in an output channel between circuit 30 and laser 32 and provides the optical drive for laser modulation. Separately, via another output channel, circuit 30 supplies an input to a frequency divider chain 34 which is part of a phase-locked indirect frequency synthesizer. This divider chain 34 generates an output having a phase fixed in relationship to that of the primary oscillator but a frequency which is 1/1024 of that frequency.

The crystal oscillator in circuit 31 is subject to voltage control and produces a signal whose frequency and phase are subject to very sensitive response to this controlling voltage. The secondary oscillator is controlled to oscillate at a slightly lower frequency than the nominal 10.7 MHz, lower by some 10.45 kHz. The output from this oscillator is supplied along two channels, one of which feeds a frequency divider chain 35 which is also part of the phase locked indirect frequency sythesizer. This divider chain 35 generates an output signal having a fixed phase relationship to that of the secondary oscillator but a frequency which is 1/1023 of that frequency.

The objective of this circuit arrangement is to so control that voltage on the secondary oscillator as to assure that the two signals produced by the divider chains 34 and 35 are identical and have no phase difference. Accordingly, the signal outputs from chains 34 and 35 are supplied to the phase comparator circuit 36 which responds to slight variations in relative phase so as to adjust the voltage signal supplied to the secondary oscillator in circuit 31.

Ceramic filter circuit 37 receives an input from the reference crystal oscillator 30, whereas ceramic filter circuit 38 receives as input signal the output from photodetector circuit 39. The latter receives the reflected version of the optical beam transmitted by laser 32 and produces a 10.7 MHz signal at the primary or reference frequency derived from modulation of the light beam. Photodetector circuit 39 includes appropriate amplification stages and serves to produce an output signal of similar strength to that supplied to filter circuit 37 with negligible phase shift. The ceramic filters in circuits 37 and 38 obstruct all but the pure sinusoidal form of the 10.7 MHz received signals. Thus the outputs from ceramic filter circuits 37 and 38 are complementary signals at the same frequency 10.7 MHz and have a phase difference which is directly proportional to the distance being measured based on speed of light propagation time.

The invention requires that both of these output signals should be subject to the mixing action already explained. The second channel 10.68955 MHz signal output from the oscillator 31 is supplied to mixer circuits 40 and 41 which receive outputs from circuits 37 and 37, respectively. These convert the 10.7 MHz reference and photodetector signals to a frequency of 10.45 kHz, whilst retaining the differential phase information. The 10.45 kHz bandpass filters 42, 43 reject spurious mixing products from mixer circuits 40, 41, respectively. High gain limiting amplifiers 44, 45 generate square wave output signals as depicted in FIG. 2 and these are fed to the timing circuit 46 which is used for phase measurement and which corresponds to circuit 18 in FIG. 2.

The operation of the circuit shown in FIG. 3 will be understood from the prior disclosure of the principles upon which the invention is based. The combination of the sythesizer technique for phase-locking the two oscillators and the heterodyne down-conversion process implemented via the mixer circuits 40, 41 and the bandpass filters 42, 43 operates to make the ultimate measurement very precise as a measure of the time needed to traverse the test distance at the speed of light. Further combination with the averaging features of the timing circuit shown in FIG. 2 add further to the reliability and precision of the measurement. The principles used in no way relate to doppler measurement by integration of the sensing of displacement. Indeed, the invention offers a precision measure of distance on an absolute basis but it is subject to the speed of light. Hence it can be used to measure refractive index and may require calibration to allow for speed of light dependence upon temperature and pressure in a gaseous propagation medium.

In applications where signal drift needs to be controlled more effectively, a fixed absolute calibration distance measurement can be provided by placing a polarized mirror in the light path at a known distance. This is depicted as 50 in FIG. 1. An electrically rotatable polar polymer or lead flint glass window 51 can then be placed in front of the transmitter so that the user can cause the signal to reflect from the polarizing mirror or pass through by operator selection. This provides a fixed standard that can be the basis of reference to check that the regular cycle of operation of the apparatus is performing correctly.

The invention will find primary application in the measurement of distance, either over a range to a target reflector or in determining the position of a test probe in a structure. As just noted, such measurement will be subject to an assumed value of lightspeed, unless calibration means are incorporated in the apparatus. Conversely, the invention can be used to measure, for example, the refractive index of a liquid, which may be useful in assessing its composition at a given temperature. In this latter case the measurement is a measurement of flight time at the speed of light over a given distance or can be said to be a distance measurement on a scale of units referenced on time and lightspeed. Generally, however, it is to be understood that the invention is concerned with precision measurements governed by the transit time at the speed of light over a known or unknown distance, being measurements which are useful in industrial applications.

In summary, the invention disclosed is based upon taking a step which would be deemed unnecessary by those skilled in the appropriate art, namely adding circuit controls to regulate the frequency relationship of two very stable oscillators, bearing in mind that it suffices, in principle, to measure a phase difference between signals which are, as a function of the frequency of a reference oscillator, respectively phase-locked to the transmitted and received signals produced at the frequency of the other oscillator.

The additional frequency regulation or phase-locking of the two stable oscillators, particularly in the manner disclosed in the described embodiment of this invention, combined with a design feature involving selection of special filter circuits exploiting the effects of such additional control, has been found to improve the performance and so the utility of the system.

By taking this 'unnecessary' step a most unexpected consequence has emerged. The action has reduced the signal noise due to the very small frequency fluctuations of the stable oscillators and this has allowed the filters which are used to process the two compared signals at the transmission frequency, before being fed to the mixers, to be very narrow frequency band pass filters. This has an enormous effect on the precision of, and the speed at which, the measurement can be indicated, especially if based on averaging of a repeated sequence of tests. Furthermore, the use of smaller measurement bandwidths affords a very substantial enhancement of the sensitivity of the system, meaning that weaker signal reflection and so longer range measurement can be accommodated by systems using the invention. An added advantage which further contributes to the overall performance is that the positive phase-locking by circuit means very close to the two oscillators results in a circuit design by which the differential phase-shifts due to frequency drift are eliminated.

The system as described is essentially an analogue implementation, but it will be obvious to those skilled in the digital processing art that the signal processing may also be implemented by digital-computational methods using known circuit techniques and components. Similarly, whereas the above description concerns two oscillators, which, though having essentially stable frequencies, subject to minor ambient and operational fluctuations, operate at slightly different frequencies, and which are nevertheless phase-locked for the purpose of this invention by analogue frequency synthesis using a phase-locked loop, there are techniques known to those skilled in the computational data processing art, whereby direct frequency synthesis of output frequencies is possible based on digital arithmetic computation. The invention extends to such implementations of a phase-locked oscillator system, when used in the manner defined by the claims for this invention.

We claim:

1. Lightspeed-related measurement apparatus, comprising means for producing a continuous signal at a fixed frequency and transmitting this signal over a test distance from a transmitting source to a sensed position and thence back to a receiver closely adjacent the transmitting source, whereby the phase of the signal is shifted during transit in relation to the phase of the signal at the source and in proportion to the distance travelled, and timing means controlled in dependence upon the phase of the transmitted signal and connected in an electronic circuit incorporating detector means which respond to the received signal and measure the relative phase shift over the test distance, the apparatus being characterized in that the electronic circuit includes signal amplitude control means for adjusting the amplitude of at least one of the signals to bring their strengths into matching relationship and separate frequency conversion means of identical design, each being connected to respond to a corresponding one of the signals, which frequency-shift both signals by an identical reducing amount before these are supplied to the timing means, whereby to provide the phase input to the timing means at a longer wavelength and so extend the time measure representing the distance as a function of the speed of light, there being incorporated within said frequency conversion means two parallel circuit paths each comprising ceramic filters and mixer circuits, with the transmitted signal and the received signal being fed as input to separate parallel circuit paths, whereby the ceramic filters each obstruct throughput of all but a pure sinusoidal signal which is fed onwards as input to a corresponding mixer circuit, where it is subjected to heterodyne downconversion of frequency by mixing with a signal of a lower control frequency supplied to both mixer circuits, the resulting output signals from these two parallel paths providing the inputs for phase difference measurement in the timing means.

2. Lightspeed-related measurement apparatus, comprising (a) means producing a continuous signal at a fixed frequency and transmitting this signal over a test distance from a transmitting source to a receiver having direct circuit connection with said source, whereby the phase of the signal is shifted during transit in relation to the phase of the signal at the source and in proportion to the distance travelled, (b) timing means controlled in dependence upon the phase of the transmitted signal and connected in an electronic circuit incorporating detector means which responds to the received signal and measures the relative phase shift over the test distance.

(c) in close proximity in the electronic circuit, separate frequency conversion means, each connected to a signal generating means producing a reference signal controlled to have a frequency that is linearly proportional to said fixed frequency and each being connected to respond to a corresponding one of the transmitted and received signals, to modify the frequencies of both signals by an identical reducing amount equal to the frequency of the reference signal before these are supplied to the timing means, whereby to provide the phase input to the timing means at a longer wavelength and so extend the time measure representing the distance as a function of the speed of light, (d) signal amplitude control means in the electronic circuit for adjusting the amplitude of at least one of the signals to bring their strengths into matching relationship, (e) a first crystal oscillator producing a primary signal and a similar second crystal oscillator producing a secondary signal and controlled to operate at a slightly different frequency, the first oscillator serving as the master control for the second oscillator, (f) two frequency divider chain circuits by which respective oscillation frequencies of the two crystal oscillators are divided by integers differing by a relatively small amount, (g) electronic circuit means connected to compare the outputs of said two frequency divider chain circuits to product a control voltage output, (h) circuit means connected to the second crystal oscillator for controlling its stable frequency operation over a limited range, which means are connected to respond to change in the control voltage output from said electronic circuit means, whereby the two oscillators become phase-locked, with their frequencies being respectively proportional to said integers and providing respectively the signal frequency governing the transmitted signal and the frequency of the signal at the control frequency and (i) signal mixer means by which a reference signal is produced by mixing the secondary signal and the received signal, whereby to retain as input to the timing means the phase difference between the transmitted and received signals at the long wavelength corresponding to the small frequency difference between the oscillator signals.

3. Lightspeed-related measurement apparatus, comprising (a) means for producing a continuous signal at a fixed frequency and transmitting this signal over a test distance from a transmitting source to a receiver having direct circuit connection with said source, whereby the phase of the signal is shifted during transit in relation to the phase of the signal at the source and in proportion to the distance travelled, (b) timing means controlled in dependence upon the phase of the transmitted signal and connected in an electronic circuit incorporating detector means which responds to the received signal and measures the relative phase shift over the test distance, (c) in close proximity in the electronic circuit, separate frequency conversion means, each connected to signal generating means producing a reference signal controlled to have a frequency that is linearly proportional to said fixed frequency and each being connected to respond to a corresponding one of the transmitted and received signals, to modify the frequencies of both signals by an identical reducing amount equal to the frequency of the reference signal before these are supplied to the timing means, whereby to provide the phase input to the timing means at a longer wavelength and so extend the time measure representing the distance as a function of the speed of light, (d) signal amplitude control means in the electronic circuit for adjusting the amplitude of at least one of the signals to bring their strengths into matching relationship, (e) oscillator means at the transmitter location for producing two separate signals having frequencies which differ by a regulated but constant frequency which is small in relation to the frequency of either signal, one of the separate signals being synthesized from a first oscillator to ensure phase coherence with a signal produced by an independent oscillator, (f) first circuit means by which one signal regulates the frequency of the transmitted signal and second circuit means by which the other signal provides a control frequency in the apparatus, (g) signal mixer means comprised within said frequency conversion means by which a reference signal is produced by mixing the control frequency signal and the received signal, whereby to retain as input to the timing means the phase difference between the transmitted and received signals at the long wavelength corresponding to the small frequency difference between the oscillator signals, which signal mixer means comprise means for generating two beat frequency signals at the small difference frequency to form the resulting reference and test signals which are then shaped to square waveform by limiter circuit means, and characterized by the timing means being sensitive to a start time set by the edge timing of one such square waveform, whereas the edge timing of the other such square waveform controls the count stop time measure of the timing means and so provides an output indication related to the distance measurement.

4. Apparatus according to claim 3, wherein the timing means is set to have a start time controlled by the edge timing of the square waveform produced by the test signal and a count stop time controlled by the immediately following corresponding edge timing of the square waveform produced by the reference signal.

5. Apparatus according to claim 3, wherein said timing means comprises electronic storage means operative to store data representing a predetermined number of sequential time-overlapping intervals which each indicate the distance measurement and means for computing a mean value of the measured distance by recurrent averaging of the data in store, which mean value constitutes the output information supplied by the apparatus.

* * * * *